United States Patent [19]

Mori

[11] Patent Number: 4,468,583
[45] Date of Patent: Aug. 28, 1984

[54] PIEZOELECTRIC ROTARY ACTUATOR

[75] Inventor: Kenji Mori, Ibaraki, Japan

[73] Assignee: Hitachi, Ltd., Tokyo, Japan

[21] Appl. No.: 539,759

[22] Filed: Oct. 7, 1983

[30] Foreign Application Priority Data

Oct. 22, 1982 [JP] Japan .............................. 57-184535

[51] Int. Cl.³ .......................................... H01L 41/08
[52] U.S. Cl. ................................... 310/328; 310/317;
310/332; 310/333
[58] Field of Search ............... 310/328, 330, 331, 332,
310/317, 333

[56] References Cited

U.S. PATENT DOCUMENTS

| 3,902,084 | 8/1975 | May, Jr. .......................... 310/317 X |
| 3,902,085 | 8/1975 | Bizzigotti ........................... 310/328 |
| 4,019,073 | 4/1977 | Vishnevsky et al. ........... 310/328 X |
| 4,219,755 | 8/1980 | O'Neill ................................ 310/328 |

FOREIGN PATENT DOCUMENTS

| 1066345 | 11/1979 | Canada ............................... 310/328 |
| 0502426 | 4/1976 | U.S.S.R. ............................. 310/328 |
| 0604058 | 4/1978 | U.S.S.R. ............................. 310/328 |
| 0771771 | 10/1980 | U.S.S.R. ............................. 310/317 |
| 0843032 | 6/1981 | U.S.S.R. ............................. 310/317 |

Primary Examiner—Mark O. Budd
Attorney, Agent, or Firm—Antonelli, Terry & Wands

[57] ABSTRACT

A rotary actuator for converting electrical energy into rotating torque comprises a stator, a rotor, a pair of annular first piezoelectric elements contracting and expanding in the radial direction in response to the application of an electrical signal, and a plurality of second piezoelectric elements disposed between the first piezoelectric elements and a holding portion of the stator for causing displacement of the first piezoelectric elements in the circumferential direction in response to the application of the electrical signal. These piezoelectric elements are alternately energized to continuously rotate the rotor.

13 Claims, 7 Drawing Figures

PIEZOELECTRIC ROTARY ACTUATOR

This invention relates to a rotary actuator for converting electrical energy into rotating torque, and more particularly to a rotary actuator using a piezoelectric element for the electro-mechanical conversion.

A rotary actuator used for actuating, for example, each of articulations of a multiarticulate robot is required to be small in size, light in weight and yet to be capable of generating a large actuating force. Rotary actuators of this kind employed hitherto include a rotary actuator of electric type such as an induction motor, a synchronous motor or a DC motor and a rotary actuator of hydraulic type such as an oil hydraulic motor. In order that a rotary actuator of electric type as described above can generate a large torque at a low rotation speed, a reduction gearing having a very large reduction ratio is required. Therefore, the structure of a drive system therefor becomes quite complex, resulting in an increased weight and a reduced mechanical efficiency. Further, such a rotary actuator requires brake means for stopping the rotation of and maintaining the position of the rotary actuator. On the other hand, the use of a rotary actuator of hydraulic type as described above is accompanied by the problem of maintenance such as leakage of oil.

Piezoelectric elements have been widely utilized in various fields in recent years, and many rotary actuators using piezoelectric elements have been proposed hitherto. An example of such a rotary actuator is disclosed in U.S. Pat. No. 4,019,073.

The rotary actuator of the kind using a piezoelectric element is required to be capable of generating a large torque at a low rotation speed and to be small in size, light in weight and simple in structure.

It is therefore an object of the present invention to provide a rotary actuator of the kind using a piezoelectric element for the electro-mechanical conversion, which is capable of continuously supplying a rotating torque.

Another object of the present invention is to provide a rotary actuator of the kind above described, which is small in size and light in weight.

Still another object of the present invention is to provide a compact rotary actuator of the kind above described.

In accordance with the present invention which attains the above objects, there is provided a rotary actuator for converting electrical energy into rotating torque comprising a stator, a rotor supported by the stator so as to be rotatable relative to the stator, a holding member provided on the stator so as to extend toward the rotor, annular first drive means disposed on both sides of the holding member for clamping and releasing the rotor by making expansive and contractive deformations in the radial direction thereof, second drive means disposed between and fixed to the first drive means and the holding member for causing rotary movement of the first drive means around the rotor, and means for applying an energizing voltage to the first and second drive means.

Other objects, features and advantages of the present invention will be apparent from the following detailed description of preferred embodiments thereof taken in conjunction with the accompanying drawings, in which.

Figure 1:
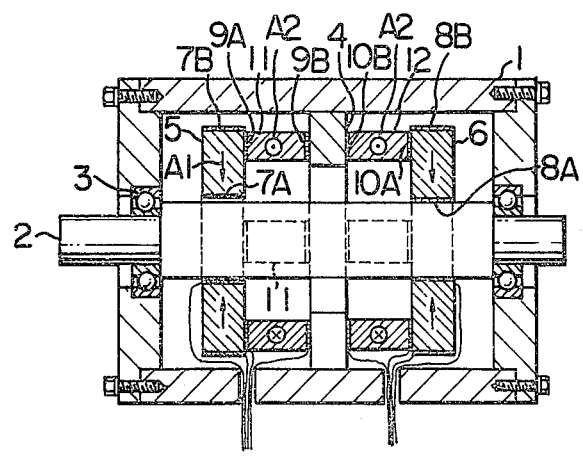
FIG. 1 is a schematic longitudinal sectional view of a preferred embodiment of the rotary actuator according to the present invention.
Figure 2:
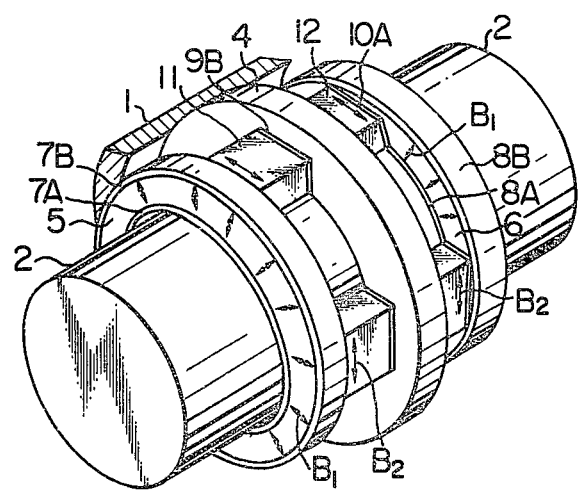
FIG. 2 is a partly sectional, schematic perspective view of the rotary actuator of the present invention shown in FIG. 1.
Figure 3:
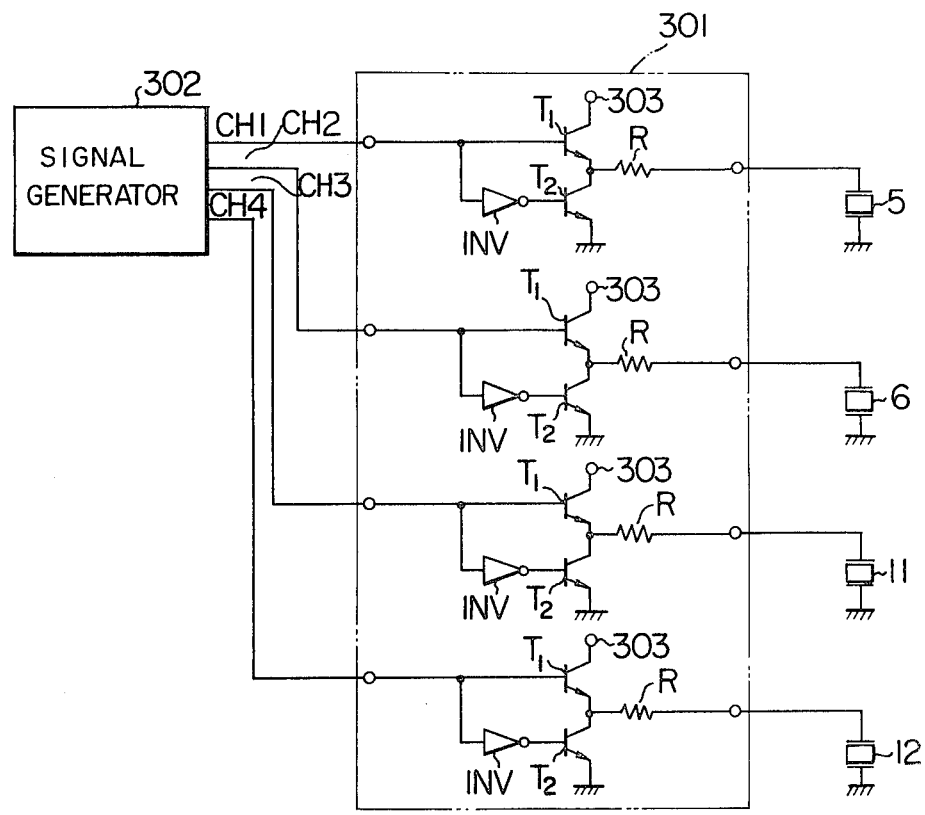
FIG. 3 is a circuit diagram of a circuit driving the rotary actuator of the present invention shown in FIG. 1.

A preferred embodiment of the rotary actuator according to the present invention will now be described in detail with reference to FIGS. 1 to 3. Referring to FIGS. 1 and 2, the reference numeral 1 designates a cylindrical body functioning as a stator. A shaft 2 is shown in bearings 3 to be rotatably supported in this cylindrical body 1. This shaft 2 functions as a rotor. A holding member 4 extends from the inner peripheral surface of the cylindrical body 1 toward the shaft 2. A pair of annular first piezoelectric elements 5 and 6 are disposed on both sides respectively of the holding member 4. These first piezoelectric elements 5 and 6 are provided at their inner and outer peripheries with a pair of electrodes 7A, 7B and a pair of electrodes 8A, 8B respectively. The first piezoelectric elements 5 and 6 are so polarized that the direction of polarization $A_1$ coincides with their radial direction. Such a manner of polarization can be attained by applying a high voltage across the piezoelectric elements 5 and 6 thereby making uniform the direction of polarization in the piezoelectric elements. When an electric field of the same direction as the polarized direction $A_1$ is applied by the electrode pairs 7A, 7B and 8A, 8B to the first piezoelectric elements 5 and 6 polarized in the manner above described, a longitudinal strain of the same direction as the polarized direction $A_1$ and a lateral strain orthogonal to the longitudinal strain occur in the first piezoelectric elements 5 and 6. In this case, the lateral strain is dominant over the longitudinal strain to cause an expansive strain and a contractive strain in the radial direction $B_1$ as shown in FIG. 2. When the contractive strain occurs in the first piezoelectric elements 5 and 6, the first piezoelectric elements 5 and 6 are brought into engagement at their inner periphery with the shaft 2 to clamp the shaft 2. On the other hand, when the contractive strain appears then in the first piezoelectric elements 5 and 6, the shaft 2 is released from the state clamped by the first piezoelectric elements 5 and 6. FIG. 1 illustrates that the first piezoelectric element 6 clamps the associated portion of the shaft 2 since the contractive strain occurs therein, while the other first piezoelectric element 5 releases the associated portion of the shaft 2 from the clamped state since the expansive strain occurs therein, thereby forming a very small gap between its inner periphery and that portion of the shaft 2.

A plurality of second piezoelectric elements 11 and 12 are disposed between and fixed to the first piezoelectric elements 5, 6 and the holding member 4 through a pair of electrodes 9A, 9B and a pair of electrodes 10A, 10B respectively around the shaft 2. These second piezoelectric elements 11 and 12 are polarized in a direction $A_2$ tangential to the shaft 2 as shown in FIG. 1. Therefore, when an electric field is applied by the electrode pairs 9A, 9B and 10A, 10B to the second piezoelectric elements 11 and 12 in a direction orthogonal to the polarized direction $A_2$, a so-called shearing strain whose direction coincides with the polarized direction $A_2$, that is, the direction shown by the arrow $B_2$ in FIG. 2 occurs in the portions of the second piezoelectric elements 11 and 12 adjacent to the first piezoelectric elements 5 and 6. When such a shearing strain appears in the second piezoelectric elements 11 and 12, the first piezoelectric elements 5 and 6 are displaced in the circumferential direction by an amount corresponding to the amount of the shearing strain.

Figure 4:
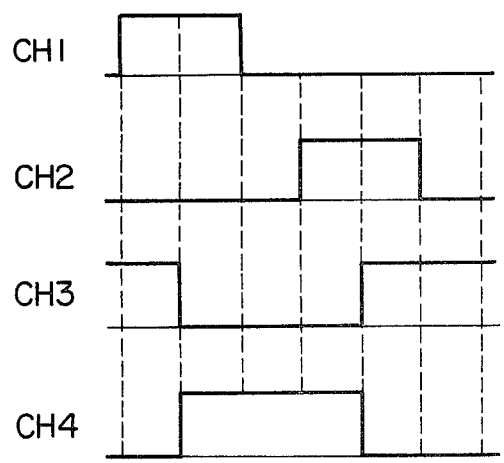
FIG. 4 is a time chart showing one form of the signal pattern supplied from the signal generator in the drive circuit shown in FIG. 3.

The fundamental structure of a preferred drive circuit supplying an energizing voltage to the first piezoelectric elements 5, 6 and second piezoelectric elements 11, 12 will be described with reference to FIG. 3. This drive circuit includes a switching circuit 301 connected to the piezoelectric elements 5, 6, 11, 12 and a signal generator 302 controlling the switching circuit 301. Terminals 303 of the switching circuit 301 are connected to a voltage source (not shown). The switching circuit 301 includes a plurality of switching sections connected at their output terminals to the piezoelectric elements 5, 6, 11 and 12 respectively, and each of these switching sections includes a pair of transistors $T_1$, $T_2$, a resistor R and an inverter INV. At the input terminals, these switching sections are connected to channels $CH_1$ to $CH_4$ of the signal generator 302 respectively. FIG. 4 shows one form of the signal pattern applied from the channels $CH_1$ to $CH_4$ of the signal generator 302. In FIG. 4, this signal pattern is illustrated to have a rectangular waveform.

When now a high level of the rectangular waveform signal is applied from the channel $CH_1$ of the signal generator 302 to energize the first piezoelectric element 5, the associated transistors $T_1$ and $T_2$ in the switching circuit 301 are turned on and off respectively, and the voltage applied from the voltage source to the associated terminal 303 is charged to the piezoelectric element 5 through the associated resistor R. On the other hand, when a low level of the rectangular waveform signal is then applied from the channel $CH_1$ of the signal generator 302, the associated transistors $T_1$ and $T_2$ in the switching circuit 301 are now turned off and on respectively, thereby discharging the voltage applied to the piezoelectric element 5.

Figure 5:
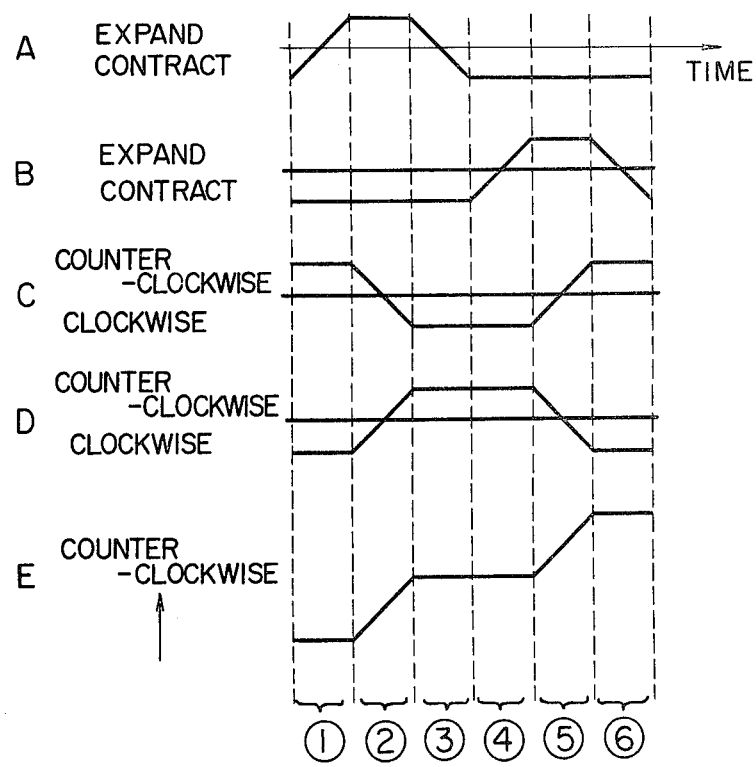
FIG. 5 is a time chart showing one form of the operation cycle of the rotary actuator of the present invention shown in FIG. 1.

Description will now be directed to how the embodiment of the rotary actuator of the present invention shown in FIG. 1 is operated according to the signal pattern shown in FIG. 4. FIG. 5 is a time chart showing how the piezoelectric elements 5, 6, 11 and 12 operate with time T in response to the signal pattern shown in FIG. 4. FIG. 5 shows in A the time chart of operation of the piezoelectric element 5 and in B that of the piezoelectric element 6. In each of the curves in A and B, a positive portion indicates that an expansive strain occurs to release the shaft 2 from the clamped state, while a negative portion indicates that a contractive strain occurs to clamp the shaft 2. FIG. 5 shows in C the operating state of the piezoelectric elements 11, and in D that of the piezoelectric elements 12. In each of the curves in C and D, a positive portion indicates that the piezoelectric elements 11 and 12 are deformed to cause counter-clockwise rotation of the piezoelectric elements 5 and 6 respectively, while a negative portion indicates that the piezoelectric elements 11 and 12 are deformed to cause clockwise rotation of the piezoelectric elements 5 and 6 respectively. FIG. 5 shows in E the angular displacement of the shaft 2 relative to the cylindrical body 1. In FIG. 5, all of the horizontal axes represent the time T, and ① to ⑥ represent the sequential steps of operation.

In the step ① in FIG. 5, the piezoelectric element 6 expands to clamp the shaft 2, while the piezoelectric element 5 contracts to release the shaft 2 from the clamped state.

In the step ②, the piezoelectric elements 12 are deformed to cause counter-clockwise rotation of the piezoelectric element 6 by one step, while, at the same time, the piezoelectric elements 11 are deformed to cause clockwise rotation of the piezoelectric element 5 by one step. Consequently, the shaft 2 is rotated counter-clockwise by one step relative to the cylindrical body 1.

In the step 3, the piezoelectric element 5 contracts to clamp the shaft 2. In the step ④, the piezoelectric element 6 expands to release the shaft 2 from the clamped state.

In the step ⑤, the piezoelectric elements 11 are deformed to cause counter-clockwise rotation of the piezoelectric element 5 by one step, while, at the same time, the piezoelectric elements 12 are deformed to cause clockwise rotation of the piezoelectric element 6 by one step. Consequently, the shaft 2 is rotated counter-clockwise by one step relative to the cylindrical body 1.

In the step ⑥, the piezoelectric element 6 contracts to clamp the shaft 2. This clamping exhibits a brake action holding the shaft 2 in its clamped state after the energizing voltage ceases to be applied.

By execution of the above six steps constituting one cycle, the shaft 2 is rotated counter-clockwise by two steps relative to the cylindrical body 1.

By repetition of the above operation thereafter, the shaft 2 can be rotated counter-clockwise continuously.

Although the above description has referred to the operation mode for rotating the shaft 2 counter-clockwise in FIG. 2, it is readily apparent that the voltage may be applied to cause reverse operation of the piezoelectric elements 11 and 12 in the operation time chart of FIG. 5 for causing clockwise rotation of the shaft 2 in FIG. 2.

Figure 6:
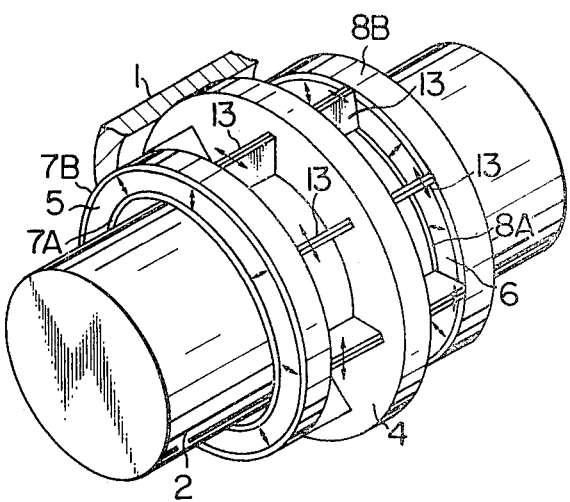
FIG. 6 is a partly sectional, schematic perspective view of another embodiment of the rotary actuator according to the present invention.

FIG. 6 shows another embodiment of the rotary actuator according to the present invention, and the same reference numerals are used in FIG. 6 to designate the same parts appearing in FIG. 1. In this second embodiment, the second piezoelectric elements 11 and 12 of shearing strain type are replaced by piezoelectric elements 13 of bimorph type. As in the case of the piezoelectric elements 11 and 12 of shearing strain type shown in FIG. 1, a plurality of such piezoelectric elements 13 of bimorph type are disposed between the holding member 4 and the first piezoelectric elements 5, 6 so as to cause displacement of the piezoelectric elements 5, 6 in the circumferential direction. According to this second embodiment, the amount of circumferential displacement of the piezoelectric elements 5 and 6 can be increased although the force generated by the piezoelectric elements 13 of bimorph type is small compared with the piezoelectric elements 11 and 12 of shearing strain type. Therefore, an actuator can be provided in which the rotor can be rotated at a higher speed.

Figure 7:
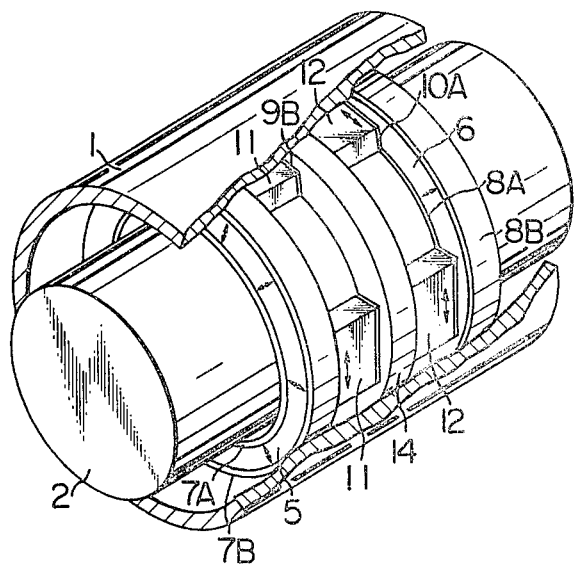
FIG. 7 is a partly sectional, schematic perspective view of still another embodiment of the rotary actuator according to the present invention.

FIG. 7 shows still another embodiment of the rotary actuator according to the present invention, and the same reference numerals are used in FIG. 7 to designate the same parts appearing in FIG. 1. The third embodiment is constructed so that the shaft 2 functions as the stator, and the cylindrical body 1 is rotatable relative to the shaft 2 to function as the rotor. To this end, the shaft 2 is provided with a holding member 14 for holding the second piezoelectric elements 11 and 12 coupled to the first piezoelectric elements 5 and 6 respectively. This holding member 14 extends from the shaft 2 toward the cylindrical body 1. The outer peripheral surface of the first piezoelectric elements 5 and 6 acts as a working surface engaged with and disengaged from the inner peripheral surface of the cylindrical body 1 to clamp and release the cylindrical body 1 when the first piezoelectric elements 5 and 6 are subjected to contraction and expansion. The operation of this third embodiment is similar to that of the embodiment shown in FIG. 1, and, therefore, any detailed description thereof is unnecessary. Since a piezoelectric body has generally a very strong resistance to a compressive stress than a tensile stress, the arrangement of the embodiment of FIG. 7 in which the first piezoelectric elements 5 and 6 are pressed against the inner periphery of the cylindrical body 1 for clamping is effective for improving the useful service life of the first piezoelectric elements 5 and 6.

In the embodiment shown in FIG. 7 too, the second piezoelectric elements 11 and 12 may be replaced by the bimorph elements shown in FIG. 6. Further, the second piezoelectric elements 11 and 12 may be of a single layer structure or of a laminated structure having many electrodes. Further, although the second drive means are coupled to the side faces of the first drive means in the aforementioned embodiments, the present invention is in no way limited to such a coupling mode, and the second drive means may be coupled to the inner or outer periphery of the first drive means. Further, the signal supplied from the signal generator in the drive circuit is in no way limited to the rectangular waveform signal described above, and an analog signal such as a sinusoidal waveform signal may be supplied. Further, a plurality of rotary actuators as described above can be disposed in a relation juxtaposed in the axial direction.

It will be understood from the foregoing detailed description that the present invention provides a rotary actuator which can continuously supply rotating torque and which is small in size, light in weight and compact in structure.

I claim:

1. A rotary actuator for converting electrical energy into rotating torque comprising:
   a stator;
   a rotor supported by said stator so as to be rotatable relative to said stator;
   a holding member provided on said stator so as to extend toward said rotor;
   annular first drive means disposed on both sides of said holding member for clamping and releasing said rotor by making expansive and contractive deformations in the radial direction thereof;
   second drive means disposed between and fixed to said first drive means and said holding member for causing rotary movement of said first drive means around said rotor; and
   means for applying an energizing voltage to said first and second drive means.

2. A rotary actuator as claimed in claim 1, wherein said stator is a cylindrical body, said rotor is a shaft inserted into said cylindrical body to be rotatably supported by said cylindrical body, and said holding member extends from said cylindrical body toward said shaft for holding said second drive means coupled to said first drive means.

3. A rotary actuator as claimed in claim 2, wherein said first drive means includes annular piezoelectric elements and a pair of electrodes provided on the inner and outer peripheries of each of said piezoelectric elements.

4. A rotary actuator as claimed in claim 3, wherein said second drive means includes piezoelectric elements of shearing strain type and a pair of electrodes provided on each of said piezoelectric elements to extend in a direction parallel to the direction of polarization of said piezoelectric element.

5. A rotary actuator as claimed in claim 3, wherein said second drive means includes piezoelectric elements of bimorph type making a deflective deformation in response to a voltage applied thereto.

6. A rotary actuator as claimed in claim 4, wherein at least one of said annular piezoelectric elements constituting said first drive means acts to still clamp said rotor due to a contractive strain persisting after it is deenergized.

7. A rotary actuator as claimed in claim 5, wherein at least one of said annular piezoelectric elements constituting said first drive means acts to still clamp said rotor due to a contractive strain persisting after it is deenergized.

8. A rotary actuator as claimed in claim 1, wherein said stator is a shaft, said rotor is a cylindrical body surronding said shaft to be rotatably supported by said shaft, and said holding member extends from said shaft toward the inner periphery of said cylindrical body for holding said second drive means coupled to said first drive means.

9. A rotary actuator as claimed in claim 8, wherein said first drive means includes annular piezoelectric elements and a pair of electrodes provided on the inner and outer peripheries of each of said piezoelectric elements.

10. A rotary actuator as claimed in claim 9, wherein said second drive means includes piezoelectric elements of shearing strain type and a pair of electrodes provided on each of said piezoelectric elements to extend in a direction parallel to the direction of polarization of said piezoelectric element.

11. A rotary actuator as claimed in claim 9, wherein said second drive means includes piezoelectric elements of bimorph type making a deflective deformation in response to a voltage applied thereto.

12. A rotary actuator as claimed in claim 10, wherein at least one of said annular piezoelectric elements constituting said first drive means acts to still clamp said rotor due to a tensile strain persisting after it is deenergized.

13. A rotary actuator as claimed in claim 11, wherein at least one of said annular piezoelectric elements constituting said first drive means acts to still clamp said rotor due to a tensile strain persisting after it is deenergized.

* * * * *